US009672482B2

(12) United States Patent
Rubin et al.

(10) Patent No.: US 9,672,482 B2
(45) Date of Patent: Jun. 6, 2017

(54) SYSTEM AND METHOD FOR AUTOMATIC OBJECTIVE REPORTING VIA WEARABLE SENSORS (71) Applicant: Palo Alto Research Center Incorporated, Palo Alto, CA (US)

(72) Inventors: Jonathan Rubin, Mountain View, CA (US); Gregory Michael Youngblood, San Jose, CA (US); Ashwin Ram, Palo Alto, CA (US); Peter L. Pirolli, San Francisco, CA (US); Jesse Vig, Palo Alto, CA (US); Shane P. Ahern, Foster City, CA (US); Lester D. Nelson, Santa Clara, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 101 days.

(21) Appl. No.: 14/302,240

(22) Filed: Jun. 11, 2014

(65) Prior Publication Data

US 2015/0364026 A1    Dec. 17, 2015

(51) Int. Cl.
*G08B 1/08* (2006.01)
*G06Q 10/06* (2012.01)
*G01C 22/00* (2006.01)
*A63B 24/00* (2006.01)
*G08B 21/18* (2006.01)

(52) U.S. Cl.
CPC .. *G06Q 10/063114* (2013.01); *A63B 24/0062* (2013.01); *G01C 22/006* (2013.01); *G08B 21/182* (2013.01)

(58) Field of Classification Search
CPC .. G01C 22/006; A63B 24/0062; G08B 21/182
See application file for complete search history.

(56) References Cited

U.S. PATENT DOCUMENTS

| 8,610,582 B2 * | 12/2013 | Jeon | A63B 71/06 340/5.32 |
| 8,734,296 B1 * | 5/2014 | Brumback | G06F 19/3406 482/8 |
| 8,738,925 B1 * | 5/2014 | Park | H04B 7/26 380/270 |

(Continued)

*Primary Examiner* — Joseph Feild
*Assistant Examiner* — Rufus Point
(74) *Attorney, Agent, or Firm* — Shun Yao; Park, Vaughan, Fleming & Dowler LLP (57) ABSTRACT One embodiment of the present invention provides a system for automatically reporting progress in completing objectives and goals of a plan. During operation, the system receives data indicating user selection and/or configuration of a plan with one or more goals, objectives, and/or milestones. The system obtains data generated by sensors in a sensing device and/or a mobile device. The sensors generate physiological data or data from detecting activity or environment associated with the user. Next, the system analyzes the data to determine whether the user has completed an objective, milestone, or goal of the plan. If the system determines that the user has completed an objective, milestone, or goal of the plan, the system pushes an alert to the mobile device indicating that the user has completed the objective, milestone, or goal.

20 Claims, 5 Drawing Sheets (56) References Cited

U.S. PATENT DOCUMENTS

| | | | | |
|---|---|---|---|---|
| 8,745,247 B1* | 6/2014 | Park | ............... | H04B 7/26 600/300 |
| 8,825,445 B2* | 9/2014 | Hoffman | ............... | A63B 24/0062 482/8 |
| 8,892,749 B2* | 11/2014 | Park | ............... | H04B 7/26 600/300 |
| 9,142,141 B2* | 9/2015 | Yeh | ............... | G01S 19/19 |
| 9,345,930 B2* | 5/2016 | Hoffman | ............... | A63B 24/0062 |
| 2004/0140348 A1* | 7/2004 | Fromm | ............... | A61B 5/681 235/105 |
| 2005/0250458 A1* | 11/2005 | Graham | ............... | G06Q 30/02 455/121 |
| 2007/0072156 A1* | 3/2007 | Kaufman | ............... | G09B 19/0092 434/236 |
| 2008/0096726 A1* | 4/2008 | Riley | ............... | A63B 24/0006 482/8 |
| 2010/0088023 A1* | 4/2010 | Werner | ............... | A63B 24/0021 701/467 |
| 2010/0292600 A1* | 11/2010 | DiBenedetto | ............... | A63B 24/0062 600/520 |
| 2011/0098928 A1* | 4/2011 | Hoffman | ............... | A63B 24/0062 702/5 |
| 2012/0015778 A1* | 1/2012 | Lee | ............... | A63B 71/0622 482/8 |
| 2012/0119911 A1* | 5/2012 | Jeon | ............... | A63B 24/0062 340/573.1 |
| 2012/0215328 A1* | 8/2012 | Schmelzer | ............... | G06F 19/3481 700/91 |
| 2013/0325404 A1* | 12/2013 | Yuen | ............... | G06F 11/00 702/182 |
| 2014/0148930 A1* | 5/2014 | Goodwin | ............... | G09B 5/00 700/92 |
| 2014/0232558 A1* | 8/2014 | Park | ............... | H04B 7/26 340/870.16 |
| 2014/0240122 A1* | 8/2014 | Roberts | ............... | G08B 21/182 340/539.11 |
| 2014/0316836 A1* | 10/2014 | Lipscher | ............... | G06Q 10/1093 705/7.19 |
| 2015/0081209 A1* | 3/2015 | Yeh | ............... | A61B 5/4815 701/427 |
| 2015/0081210 A1* | 3/2015 | Yeh | ............... | G09B 19/0038 701/428 |
| 2015/0186609 A1* | 7/2015 | Utter, II | ............... | A61B 5/0022 600/301 |
| 2015/0206413 A1* | 7/2015 | Warner | ............... | G06Q 50/22 340/573.1 |
| 2015/0251055 A1* | 9/2015 | Ashby | ............... | G09B 19/0038 482/8 |
| 2015/0269848 A1* | 9/2015 | Yuen | ............... | G09B 5/125 434/236 |
| 2015/0366504 A1* | 12/2015 | Connor | ............... | A61B 5/6804 600/301 |

* cited by examiner

SYSTEM AND METHOD FOR AUTOMATIC OBJECTIVE REPORTING VIA WEARABLE SENSORS

BACKGROUND

Field

The present disclosure relates to activity tracking. More specifically, this disclosure relates to a method and system for tracking user progress with wearable sensors to facilitate automatic reporting of objective completion in a fitness plan or other type of plan.

Related Art

Modern mobile devices have the ability to deliver programs and content to individuals in order to help them achieve personal goals. For example, health, fitness or financial planning applications may deliver such content to mobile devices. These applications may deliver plans with milestones and objectives to a user's mobile phone or other device and the user typically reports progress through manual interaction via a graphical user interface. For example, a user may manually select an option to confirm whether or not the user has achieved a goal by tapping a button on a touch-based user interface. By performing this action, the user records his or her progress and can advance through the program. Unfortunately, this process is inefficient and prone to errors because it relies on the user to remember to update the plans and to manually report completion of their objectives.

SUMMARY

One embodiment of the present invention provides a system for automatically reporting progress in completing objectives and goals of a plan. During operation, the system receives data indicating user selection and/or configuration of a plan with one or more goals, objectives, and/or milestones. The system obtains data generated by one or more sensors in a sensing device and/or a mobile device. The one or more sensors generate physiological data or data from detecting activity or environment associated with the user. Next, the system analyzes the data to determine whether the user has completed an objective, milestone, or goal of the plan. Responsive to determining that the user has completed an objective, milestone, or goal of the plan, the system pushes an alert to the mobile device indicating that the user has completed the objective, milestone, or goal.

In a variation on this embodiment, the system pushes an alert to the mobile device indicating one of: the user has completed a certain percentage of an objective, milestone, or goal; the user has completed a number or percentage of objectives of the plan; and the user must complete a certain percentage or number of tasks or other activities to complete an objective, milestone, or goal.

In a variation on this embodiment, the system delivers one or more plans to the mobile device.

In a variation on this embodiment, obtaining data includes querying an online service that stores data received from the sensing device and/or mobile device.

In a variation on this embodiment, the system sends a message to the mobile device requesting confirmation that the user has completed an objective, milestone, or goal of the plan In a variation on this embodiment, obtaining data comprises receiving sensor data directly from the sensing device and/or mobile device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of requiring users to manually report completion of objectives by monitoring user activity with sensors, automatically detecting successful completion of objectives, milestones, and goals of a plan, and alerting the user of the successful completion. A plan is a program designed to achieve one or more goals through completion of objectives and milestones. An objective is an intermediate goal and a milestone is an important point in the user's progress towards completing the plan.

An automatic objective reporting system may retrieve and analyze a user's sensor data, update the user's plan and other profile data, and alert the user that he or she has completed an objective, milestone, or goal. This frees the user to perform the user's activities, and the user need not be concerned about accurately keeping track of achievements (e.g., common mistakes include incorrectly reporting that a goal was completed or forgetting to update the plan). Automatically reporting user progress and alerting the user of his or her achievements reduces the possibility of errors in recording user progress, and the user can focus on performing the plan's activities.

The automatic objective reporting system may track user activity through sensors (e.g., accelerometers) that generate sensor data. These sensors may be in sensing devices or mobile devices. A sensing device is typically a wearable sensor that can collect the user's physiological readings, geo-location information, sleeping pattern information, and other health, activity, or environmental data. A mobile device can be a smartphone, tablet, music player, or other portable computing device, and can include embedded sensors.

In some implementations, the system may retrieve sensor data from an online service that receives and stores such data from sensing devices. A server may query for data associated with a user and keep track of the user's progress. In some implementations, there may be an application installed on the user's mobile device that can collect and send sensor data, as well as present the user with the plan details and alerts.

System Architecture

Figure 1:
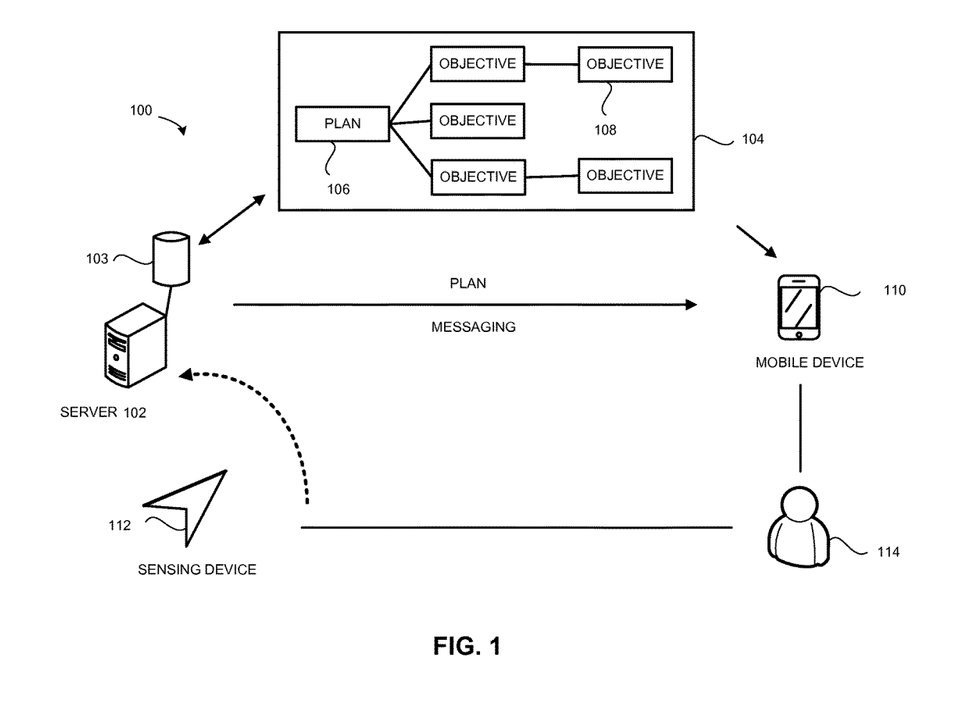
FIG. 1 presents a block diagram illustrating an exemplary architecture of an automatic objective reporting system, according to an embodiment.

FIG. 1 presents a block diagram illustrating an exemplary architecture of an automatic objective reporting system 100, according to an embodiment. As illustrated in FIG. 1, system 100 includes a server 102 with storage device 103 which stores and maintains one or more user profiles 104 with plans. Each plan 106 includes one or more objectives 108, milestones, and goals. Server 102 stores details about the plans, including information about each user's progress throughout a plan. Server 102 may send the plans to mobile device 110 and obtain data indicating user progress in completing a plan.

Server 102 may retrieve, store and analyze data for each user. Server 102 may retrieve and store sensor data generated by personal sensing devices, such as sensing device 112. In some implementations, server 102 may also retrieve data generated by sensors in mobile device 110. Server 102 records data for each objective or milestone a user achieves. Server 102 may analyze plan information, details about a user's progress, and his or her personal sensor data to determine whether that individual has completed a plan's objective or goal.

A plan may include multiple objectives for reaching a target goal. A plan can be composed either manually by a human expert or automatically by an intelligent system. There can be training plans, diet plans, or any other type of plans that have one or more goals. Examples include a health and fitness regimen for goals such as losing weight, improving overall fitness, or eating healthier by adding more fruits and vegetables to a diet.

A plan is composed of milestones, which users must adhere to in order to successfully complete the plan or attain a particular goal. Under a standard approach, users are required to report successful completion of milestone/objectives while they progress through the individual stages of the plan. However, embodiments of the present invention allow the system to automatically detect that the user has completed an objective, milestone, or goal of a plan.

Server 102 may detect user progress by collecting sensor data generated by mobile device 110 and/or sensing device 112. In some implementations, server 102 may query a service to retrieve sensor data, such as a Fitbit® service that has its own separate database for storing sensor data. Sensing device 112 (and/or mobile device 110) may automatically upload sensor data to a service (e.g., Fitbit® service) for storage and analysis. The upload may occur periodically or whenever there is data to upload. In some implementations, sensing device 112 and/or mobile device 110 may automatically upload sensor data to server 102.

Mobile device 110 is capable of delivering plans to users and recording user progress. It is also capable of personal messaging. Each of these mobile devices 110 is associated with a user 114. Some examples of mobile device 110 are smartphones, tablets, and personal music players and organizers. Mobile devices 110 may have built-in sensors and can automatically collect sensor data for the user's activities. It can send sensor data to server 102.

Some of the sensors which may be in mobile devices (and some sensing devices) may include, for example, magnetometers, accelerometers, and gyroscopes. Other sensors include light sensors and proximity sensors. Mobile device 110 may also measure altitude, pressure, temperature, humidity and other aspects of the user's environment. Some mobile devices also include heart-rate monitors as well as sensors to detect perspiration. Mobile device 110 may also include global positioning system (GPS), Wi-Fi, cellular, and near field communication (NFC) capability. The sensors in mobile device 110 can generate data that server 102 (or another component) can analyze to recognize distinct activities.

Sensing device 112 may be a wearable device. For example, sensing device 112 may be a Fitbit® or Jawbone Up® activity tracker. Other personal sensing devices may include, for example, a wearable physiological sensor (e.g., VitalConnect). Sensing device 112 may collect raw data such as physiological readings, geo-location information, or accelerometer and GPS readings. Note that physiological readings include quantifiable data (or metrics) related to a person's characteristics and traits. Sensing device 112 (and mobile device 110) may track the user's walking (e.g., distance, speed, and/or time), sleeping patterns, stair climbing, and other activities. For example, sensing device 112 may record the number of steps that the user takes. Some sensing devices may track the number of calories burned, and intensity of workouts.

The system architecture may include a messaging system capable of broadcasting messages from server 102 to an individual user's mobile device. After server 102 determines that a user has successfully completed a plan objective (e.g., by analyzing data on server 102), server 102 may push a message to a user's mobile device. The messaging system can be, for example, iOS and Android type notifications, text messages, email or personal messages.

Exemplary Process for Automatic Objective Reporting

Figure 2:
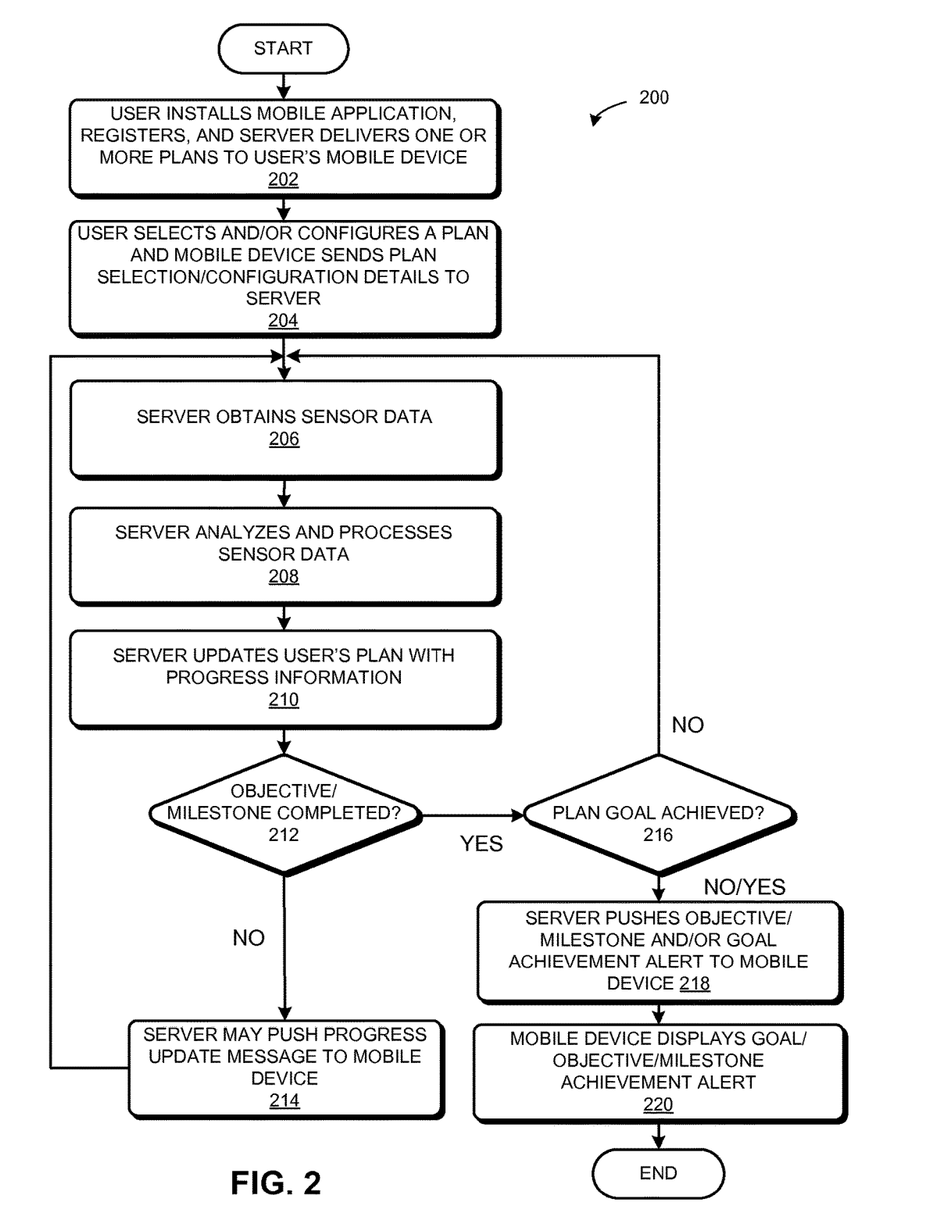
FIG. 2 presents a flowchart illustrating an exemplary process for automatic objective reporting, according to an embodiment.

FIG. 2 presents a flowchart illustrating an exemplary process for automatic objective reporting, according to an embodiment. User 114 may install a mobile application on mobile device 110. The mobile application may download plan data from server 102 and send the user's selected plan configuration to server 102. Server 102 obtains sensor data and updates the user's plan and other profile data based on his or her progress, and sends an alert to mobile device 110 when user 112 has completed an objective, milestone, or goal.

User 102 may initially download and install a mobile application on his or her mobile device (operation 202). User 114 may execute the mobile application and optionally register with server 102. The mobile application may communicate with server 102 to download one or more plans. Some implementations may allow the mobile application to download one or more plans without requiring registration. Some implementations may allow users to view plans and customize a plan using any type of computing device, including a laptop or desktop. Such users may not have a mobile device available but seek the benefits of automatically reporting completion of objectives, milestones, and goals and receiving alerts notifying them of their achievements.

User 114 may select and/or configure a plan (operation 204). Server 102 may offer a variety of plans and user 114 may select one or more plans. User 114 may purchase the plan. A plan includes a number of objectives and one or more goals. An objective may include a number of tasks. Mobile device 110 may present user 114 with a list of tasks and objectives associated with each plan. A plan may also include one or more milestones that a user may reach by completing a predetermined number or set of objectives. For example, a goal may be to lose a target amount of weight (e.g., 30 pounds) or to walk a cumulative target number of miles. An example of an objective may be to lose 2 pounds during one month. Another example objective may be to climb 50 steps of stairs in a day. An example of a milestone may be to lose 20 pounds out of the goal of 30 pounds.

In some implementations, user 114 may choose multiple plans associated with multiple goals, or any combination of plans, goals, and objectives. User 114 may choose to add multiple objectives to his or her chosen plans. A user may be associated with one or more plans in the user's profile. User 114 may customize a plan from a template. For example, user 112 may customize a fitness plan. User 114 may also choose multiple goals and server 102 may send alerts to user 114 until he or she has completed all goals.

In some implementations, user 114 may select and/or configure a plan online, and server 102 delivers the selected plan to mobile device 110. In some implementations, server 102 may analyze data from online services storing the user's sensor data and recommend a plan, or server 102 may query an online service to retrieve the user's previously selected and configured plan information.

After user 112 has selected a plan, mobile device 110 may send the plan selection and/or configuration details to server 102. Server 102 may store the plan selection and/or configuration details, including objectives and goals associated with the user's plan, in a profile associated with the user. In some implementations, server 102 may send details of the selected plan to mobile device 110 after the user makes a selection online. Mobile device 110 may also present user 110 with a list of tasks and objectives at this time.

Server 102 may obtain sensor data generated by sensing device 112 and/or mobile device 110 (operation 206). In some implementations, server 102 may query a service to retrieve sensor data, such as a Fitbit® service that receives and stores sensor data. Server 102 may query for data according to a periodic schedule. Note that server 102 may also query for data according to a schedule specified by an administrator, determined by a probability distribution, whenever a predetermined quantity of data is available, or according to any other time schedule.

User 114 may activate sensing device 112 and/or an application on mobile device 110, and sensors on the devices may detect activity, environment and/or physiology associated with the user and generate data. Sensing device 112 and/or mobile device 110 may send the data to a service that receives and stores sensor data.

In some implementations, sensing device 112 and/or mobile device 110 may directly send sensor data to the server 102 and server 102 may store the sensor data in one or more databases. Sensing device 112 and/or mobile device 110 may send the data continuously, intermittently, periodically, or according to any other schedule. Server 102 may notify the user that the sensors are detecting (or have detected) the user's activity, environment, physiology, or any other information described in FIG. 1. Server 102 may notify the user that it is automatically retrieving the sensor data (e.g., from an online service, from sensing device 112, or mobile device 110) and will alert the user regarding his or her progress in a plan.

In some implementations, mobile device 110 may receive sensor data from sensing device 112 and then processes and forwards the sensor data to server 102 and/or another online service. For example, an application on mobile device 110 may receive sensor data from wearable sensors and forwards such data to server 102. Mobile device 110 may also be equipped with sensors that generate data. Mobile device 110 may also send the data generated from its own sensors to server 102. Some implementations may also allow user 114 to optionally choose to manually input their activities, achievements, and other progress data into mobile device 110, and mobile device 110 forwards the data to server 102.

The sensor data may indicate the type of activity (e.g., walking, driving, cycling etc.) that the user is performing. This is possible due to data from an accelerometer and other sensing devices. The sensor data may indicate the distance that the user has traveled, the number of steps the user has taken, the number of steps per minute, the number of laps the user swam, the number of hours that the user has slept, etc.

Server 102 may analyze and process the sensor data (operation 208). Server 102 may interpret and parse the sensor data. In some implementations, server 102 may determine and report a user's progress as a percentage, number, or set of objectives or specific milestones completed (e.g., within a specific interval of time).

Server 102 may also determine a user's progress in a plan (e.g., as a percentage of total plan activity). Server 102 may update the user's plan according to user's progress (operation 210). Server 102 may store data in the user's profile that includes sensor data and analysis results indicating the user's progress. Server 102 may store data indicating which objectives, milestones, or goals have been completed.

If user 114 has not completed an objective/milestone within the plan (operation 212), server 102 may push a progress update message to mobile device 110 (operation 214). In some implementations, server 102 may determine that user 114 has completed an objective only when his or her performance has reached a predetermined threshold. For example, server 102 may determine that user 114 has walked less than 1 mile today and may send a message indicating that the user is falling behind and not completing an objective of the plan (e.g., user 114 is not walking a sufficient distance today and must walk an additional 0.7 miles).

Server 102 may also push other notifications to the user device to keep the user updated on his or her progress in terms of completing an objective or goal. For example, server 102 may notify a user that the system has detected the user has ran for 5 miles and has completed 80% of an objective or a plan. Server 102 may also notify user 114 that he or she is ahead of schedule in completing their objective, or that the user is close to completing an objective/milestone or a goal. Server 102 may also send a message indicating how much more activity user 114 needs to perform to complete an objective or goal, or may provide user 114 a comparison of the user's performance with other people having comparable plans. Server 102 may also send an estimate of when user 114 may expect to complete their objective or goal according to the current rate of progress. Server 102 may then continue obtaining sensor data (operation 206).

If user 114 has completed both an objective/milestone and a goal of the plan (operation 212 and operation 216), then server 102 may push objective/milestone achievement and/or plan achievement alerts (operation 218). Mobile device 110 then displays the goal and/or objective/milestone achievement alert to user 114 (operation 220). Note that alerts may also be audio alerts, vibration alerts, or some combination of visual, audio, and vibration alerts. Server 102 may also send a message requesting confirmation that user 114 has completed an objective, milestone, or goal.

If user 114 has completed an objective/milestone but has not yet achieved the goal of the plan (operation 212 and operation 216), then server 102 may continue to obtain sensor data (operation 206), and also push an objective/milestone achievement alert to mobile device 110 (operation 218). For example, server 102 may push an alert indicating that user has ran for 25 miles this week and has completed her objective/milestone. Mobile device 110 then displays the objective/milestone completion message to user 114 (operation 220). As previously indicated, server 102 may also send a message requesting confirmation that user 114 has completed an objective/milestone. In some implementations, if a plan has multiple goals then server 102 may continue to monitor user 114 and continue with operation 206. In some implementations, objectives can include tasks and server 102 can also detect task completion, and send alerts regarding task completion, and request confirmation of task completion as well.

Exemplary Mobile Device

Figure 3:
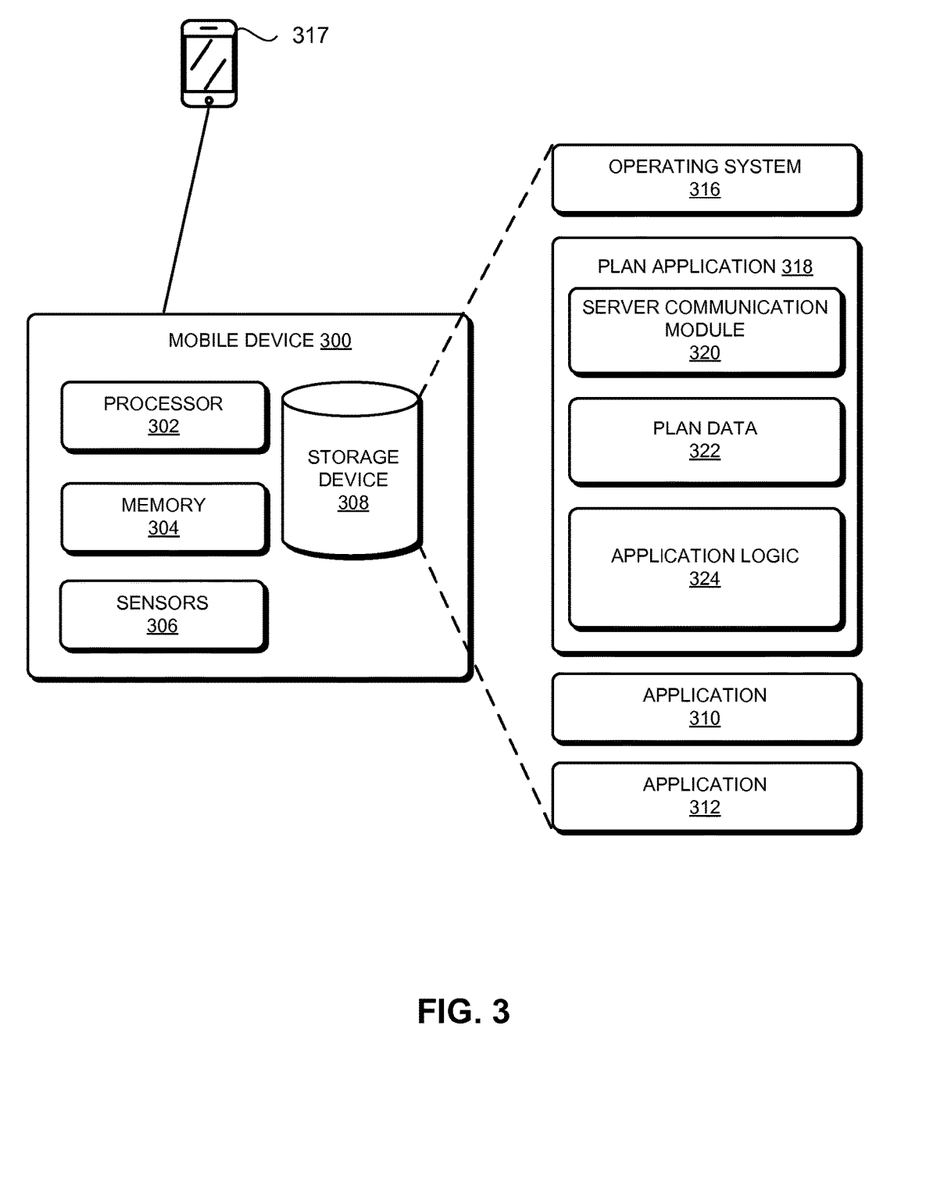
FIG. 3 illustrates an exemplary mobile device that may manage plans for a user, in accordance with an embodiment.

FIG. 3 illustrates an exemplary mobile device that may manage plans for a user, in accordance with an embodiment. In one embodiment, mobile device 300 includes a processor 302, a memory 304, sensors 306, and a storage device 308. Sensors 306 may represent any number or type of sensors, including an accelerometer, gyroscope, altimeter, or any of the other sensors described with respect to FIG. 1. Storage device 308 stores a number of applications, such as applications 310 and 312 and operating system 316. Storage device 308 also stores plan application 318, which may include components such as server communication module 320, plan data 322, and application logic 324. Server communication module 320 facilitates communication with server 102, and may receive alerts from server 102. Plan data 322 stores plan-related data and any other data, including alerts received from server 102, details of user progress for the user's chosen plan, and available plans. Some implementations may store sensor data with plan data 322, while other implementations can store sensor data separately. Application logic 324 performs all the remaining functions of plan application 318, including interacting with user 114, and updating user progress in plan data 322.

During operation, one or more applications, such as plan application 318, are loaded from storage device 308 into memory 304 and then executed by processor 302. While executing the program, processor 302 performs the aforementioned functions.

Exemplary Apparatus

Figure 4:
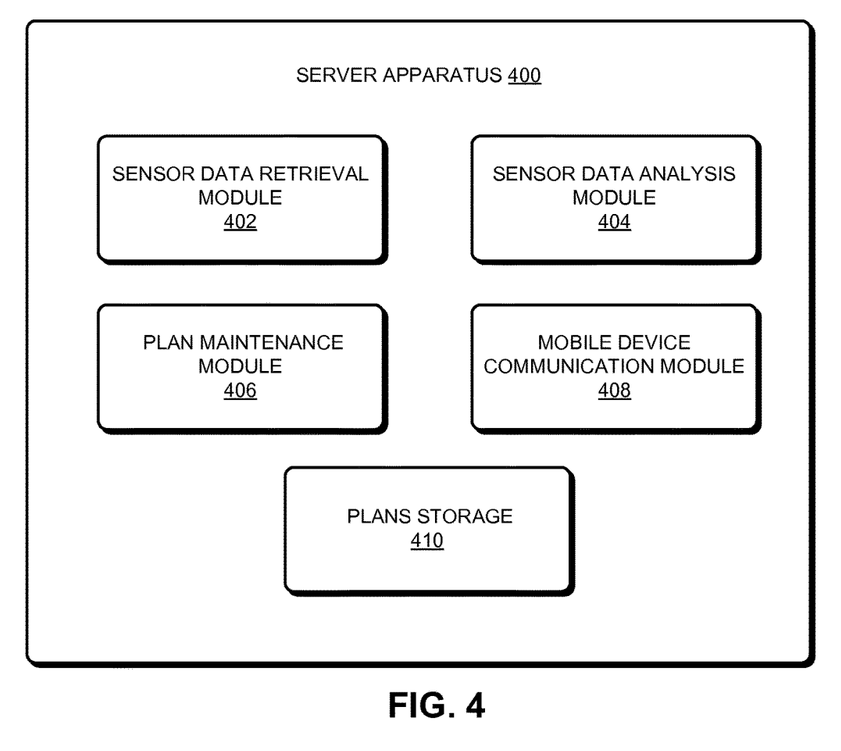
FIG. 4 presents a block diagram illustrating an exemplary server apparatus of an automatic objective reporting system, in accordance with an embodiment.

FIG. 4 presents a block diagram illustrating an exemplary server apparatus 400 of an automatic objective reporting system, in accordance with an embodiment. Apparatus 400 can comprise a plurality of modules which may communicate with one another via a wired or wireless communication channel. Apparatus 400 may be realized using one or more integrated circuits, and may include fewer or more modules than those shown in FIG. 4. Further, apparatus 400 may be integrated in a computer system, or realized as a separate device which is capable of communicating with other computer systems and/or devices.

Specifically, apparatus 400 can comprise any combination of a sensor data retrieval module 402, a sensor data analysis module 404, a plan maintenance module 406, a mobile device communication module 408, and a plans storage 410. Note that apparatus 400 may also include additional modules and data not depicted in FIG. 4, and different implementations may arrange functionality according to a different set of modules. Embodiments of the present invention are not limited to any particular arrangement of modules.

Sensor data retrieval module 402 queries online services to collect sensor data. Sensor data analysis module 404 analyzes sensor data to determine whether a user has completed an objective or a goal. Plan maintenance module 406 updates plans or objectives to indicate that the user has completed various objectives or plans, or that the user has completed a certain percentage of an objective or plan. Mobile device communication module 408 pushes alerts and other messages to mobile device 110 and may receive data (e.g., sensor data) from mobile device 110. Plans storage 410 stores all available plans.

Exemplary Server

Figure 5:
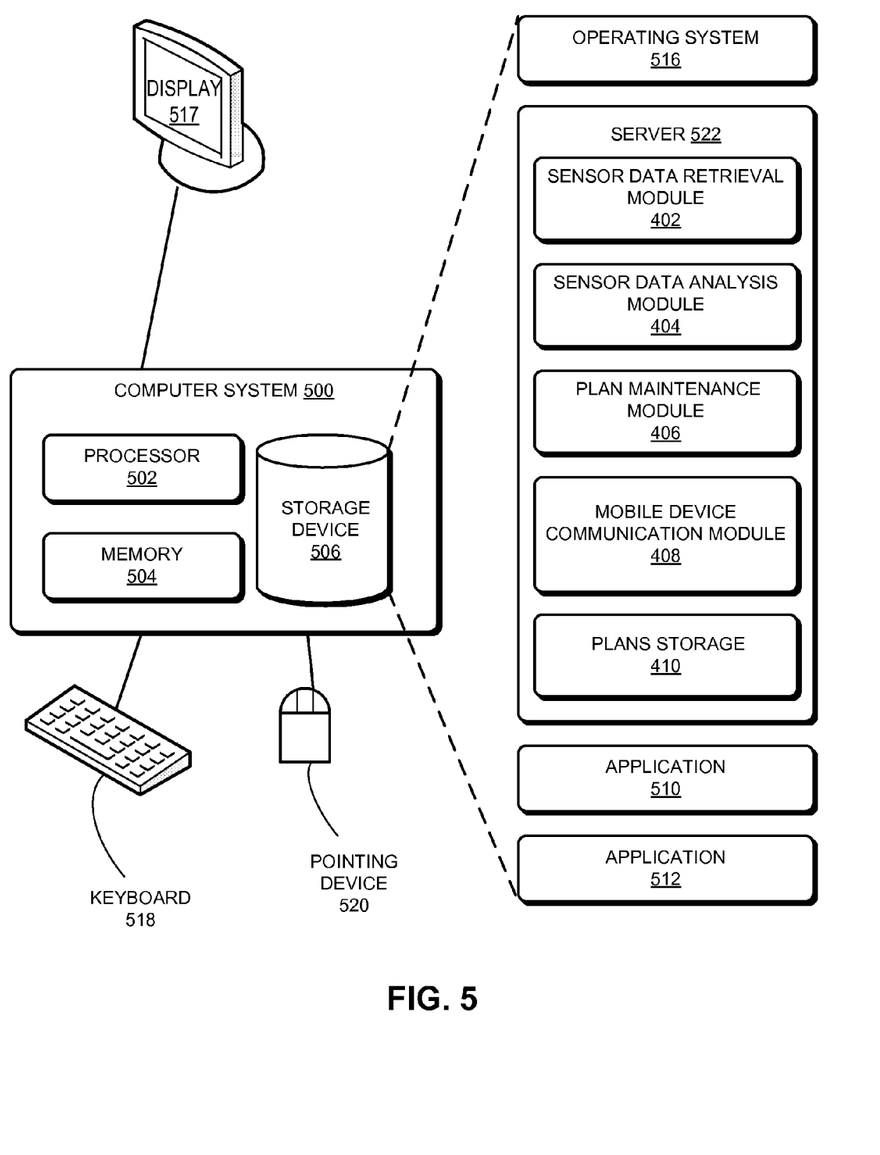
FIG. 5 illustrates an exemplary computer system that may perform the functions of a server, in accordance with an embodiment.

FIG. 5 illustrates an exemplary computer system that may perform the functions of a server, in accordance with an embodiment. In one embodiment, computer system 500 includes a processor 502, a memory 504, and a storage device 506. In one implementation, storage device 506 is an example of storage device 103 depicted in FIG. 1. Storage device 506 stores a number of applications, such as applications 510 and 512 and operating system 516. Storage device 506 also stores code for server 522, which may include components such as sensor data retrieval module 402, sensor data analysis module 404, plan maintenance module 406, mobile device communication module 408, and plans storage 410.

Sensor data retrieval module 402 queries sensor data from online services that store users' sensor data. Sensor data analysis module 404 analyzes sensor data to determine whether users have achieved their objectives, milestones, and goals. Plan maintenance module 406 updates user profiles and manages user data. Mobile device communication module 408 sends alerts and other messages to mobile device 110 and may receive data (e.g., sensor data) from mobile device 110. Plans storage 410 stores all available plans During operation, one or more applications, such as sensor data retrieval module 402, are loaded from storage device 506 into memory 504 and then executed by processor 502. While executing the program, processor 502 performs the aforementioned functions. Computer and communication system 500 may be coupled to an optional display 517, keyboard 518, and pointing device 520.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for reporting progress in completing milestones and goals of a wellness plan, comprising:
   receiving, from a user's client device, data indicating user configuration of a plan comprising an overall goal, and multiple milestones designated to specify progress toward the overall goal;
   obtaining data generated by a sensor monitoring the user, wherein the sensor generates physiological data or data from detecting activity or environment associated with the user;
   analyzing the data to determine a percentage to which the user has completed a respective milestone designated within the plan to specify a progress toward the overall goal;
   identifying a second user currently engaged in a second wellness plan with multiple comparable milestones to the user's plan;
   obtaining, by the server, additional data generated by a second sensor monitoring the second user;
   analyzing the additional data to determine a current performance of the second user within the comparable second plan; and
   producing an alert comparing the percentage to which the user has completed the respective milestone designated to specify the progress toward the overall goal, with the current performance of the second user having the comparable second plan.

2. The method of claim 1, further comprising, responsive to determining that the user has not completed the respective milestone, pushing the alert to the client device, wherein the alert further indicates that the user has not completed the respective milestone or is falling behind schedule.

3. The method of claim 1, further comprising delivering at least the user-configured plan to the client device.

4. The method of claim 1, wherein obtaining data comprises querying an online service that stores data received from the sensing device.

5. The method of claim 1, further comprising:
   sending a message to the client device requesting confirmation that the user has completed a milestone, or the overall goal of the plan.

6. The method of claim 1, wherein obtaining data comprises receiving sensor data directly from the sensing device.

7. A computing system for automatically reporting progress in completing milestones and goals of a wellness plan, the system comprising:
   one or more processors associated with a server,
   a computer-readable medium associated with the server and coupled to the one or more processors having instructions stored thereon that, when executed by the one or more processors, cause the one or more processors to perform operations comprising:
   receiving, from a user's client device, data indicating user configuration of a plan comprising an overall goal, and multiple milestones designated to specify progress toward the overall goal;
   obtaining data generated by a sensor monitoring the user, wherein the sensor generates physiological data or data from detecting activity or environment associated with the user;
   analyzing the data to determine a percentage to which the user has completed a respective milestone designated within the plan to specify a progress toward the overall goal;
   identifying a second user currently engaged in a second wellness plan with multiple comparable milestones to the user's plan;
   obtaining, by the server, additional data generated by a second sensor monitoring the second user;
   analyzing the additional data to determine a current performance of the second user within the comparable second plan; and
   producing an alert comparing the percentage to which the user has completed the respective milestone designated to specify the progress toward the overall goal, with the current performance of the second user having the comparable second plan.

8. The computing system of claim 7, further comprising, responsive to determining that the user has not completed the respective milestone, pushing the alert to the client device, wherein the alert further indicates one or more of:
   that the user has not completed the respective milestone or is falling behind schedule;
   that the user has nearly completed the respective milestone;
   an amount or the percentage of the respective milestone the user has completed; and
   when the user will complete the respective milestone according to the user's current rate of progress.

9. The computing system of claim 7, wherein obtaining data comprises querying an online service that stores data received from the sensing device.

10. The computing system of claim 7, further comprising:
    sending a message to the client device requesting confirmation that the user has completed a milestone, or the overall goal of the plan.

11. The computing system of claim 7, wherein obtaining data comprises receiving sensor data directly from the sensing device.

12. A computing system for reporting progress in completing milestones and goals of a wellness plan, comprising:
    a processor associated with a client device,
    a computer-readable medium associated with the client device and coupled to the processor having instructions stored thereon that, when executed by the processor, cause the processor to perform operations comprising:
    transmitting, by the client device, data indicating a user's configuration of a plan comprising an overall goal, and further comprising a set of milestones designated to specify progress toward the overall goal;
    sensing, by a sensor monitoring the user, data describing the user's activities, physiology, and/or environment;
    receiving an alert indicating:
      a percentage to which the user has completed a respective milestone designated within the plan to specify a progress toward the overall goal, or has completed the overall goal; and
      a comparison of the user's performance, which indicates the percentage to which the user has completed the respective milestone designated to specify the progress toward the overall goal, with a current performance of a second user currently engaged in a second wellness plan with multiple comparable milestones to the user's plan, wherein the comparison is based on additional data generated by a second sensor or device monitoring the second user; and notifying the user of the alert on the client device.

13. The computing system of claim 12, further comprising:

receiving, from the server, a request for data from the sensor embedded on the client device;

transmitting, to the server, the data sensed by the sensor;

receiving the alert, wherein the percentage to which the user has completed the respective milestone designated within the plan indicates a partial completion of the respective milestone; and notifying the user of the partial completion of the respective milestone.

14. The method of claim 1, further comprising, responsive to determining that the user has completed at least a threshold percentage of the respective milestone, pushing the alert to the client device, wherein the alert further indicates that the user has nearly completed the respective milestone.

15. The method of claim 1, further comprising, responsive to determining that the user has not completed the respective milestone, pushing the alert to the client device, wherein the alert further indicates an amount or percentage of the respective milestone the user has completed.

16. The method of claim 1:

wherein analyzing the additional data to determine the current performance of the second user further comprises determining a second percentage to which the second user has completed a second overall goal or second milestone designated within the second plan; and wherein the alert with the comparison compares the percentage to which the user has completed the respective milestone of the user with the second percentage to which the second user has completed the second overall goal or second milestone.

17. The method of claim 1, further comprising, responsive to determining that the user has not completed the respective milestone, pushing the alert to the client device, wherein the alert further indicates when the user will complete the respective milestone according to the user's current rate of progress.

18. The method of claim 1, further comprising, responsive to determining that the user has not completed the respective milestone, pushing the alert to the client device, wherein the alert further indicates how much progress the user must make in a respective day in order to maintain a sufficient rate of progress.

19. The method of claim 1, further comprising, responsive to determining that the user has not completed the overall goal of the plan, pushing the alert to the client device further indicating a set of milestones that the user has completed, wherein the milestones specify progress toward the overall goal.

20. The method of claim 1:

wherein the overall goal in the user-configured plan specifies a goal health or fitness outcome;

wherein the multiple milestones include one or more of the following outcome milestones:

a quantity of weight lost by the user over a recent time interval;

an indicator of improved overall fitness of the user;

a quantity of healthy foods in a diet of the user over a recent time interval; and a quantity of fruits and vegetables in a diet of the user over a recent time interval; and further comprising, responsive to receiving the user configuration data:

generating, by the server, the plan, including the goal outcome and the one or more outcome milestones, and wherein the plan specifies multiple exercise sessions; and sending the plan to the client device of the user.

* * * * *